L. T. RASMUSSEN.
FURROW OPENER.
APPLICATION FILED FEB. 21, 1910.
990,500.
Patented Apr. 25, 1911.
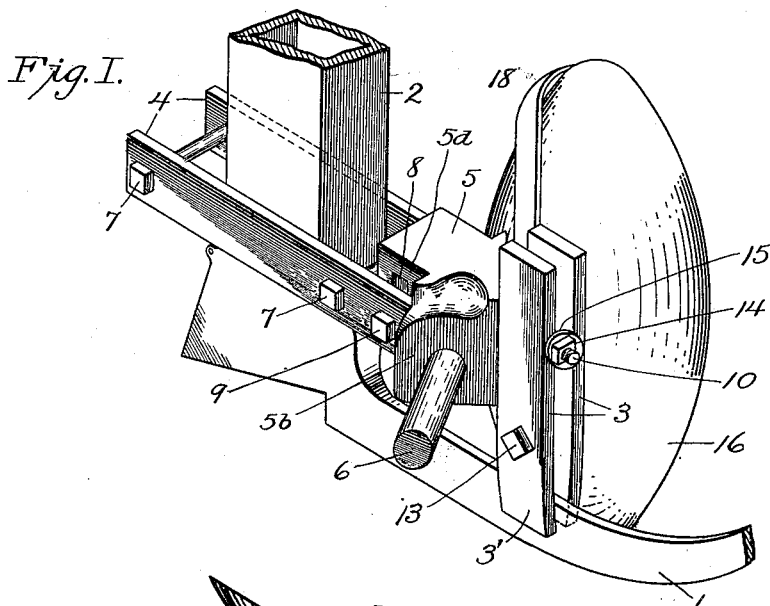
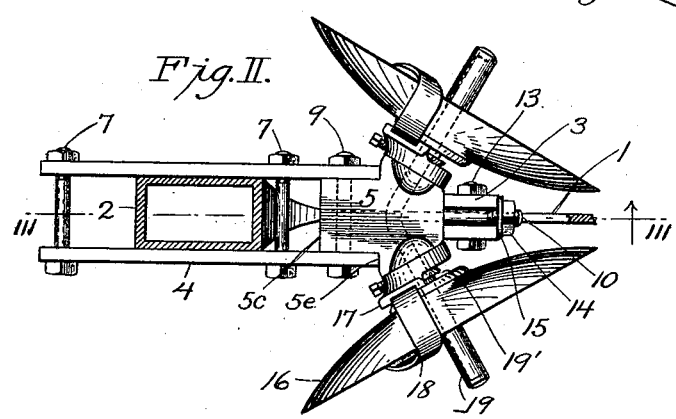
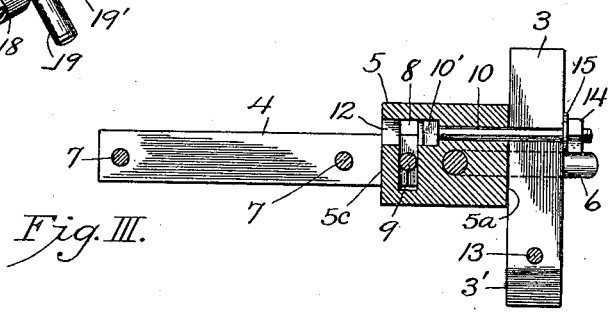
WITNESSES:
INVENTOR.
Laurits T. Rasmussen.
BY
ATTORNEY.

UNITED STATES PATENT OFFICE.

LAURITS T. RASMUSSEN, OF COUNCIL BLUFFS, IOWA, ASSIGNOR TO WALKER MANUFACTURING COMPANY, OF COUNCIL BLUFFS, IOWA, A CORPORATION OF SOUTH DAKOTA.

FURROW-OPENER.

990,500.     Specification of Letters Patent.     Patented Apr. 25, 1911.

Application filed February 21, 1910. Serial No. 545,246.

*To all whom it may concern:*

Be it known that I, LAURITS T. RASMUSSEN, a citizen of the United States, residing at Council Bluffs, in the county of Pottawattamie and State of Iowa, have invented certain new and useful Improvements in Furrow-Openers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to furrow openers, and has for its object to provide a device of that class, which may be easily and quickly attached to a planter of ordinary construction, and in which the axle head may be adjusted without removing the disks.

A further object is to provide improved means for receiving the thrust of the disks.

These and other objects are attained by the construction herein described, pointed out in the claims, and illustrated in the accompanying drawings, in which:—

Figure I is a perspective view of my improved furrow opener, minus one of the disks, mounted upon the shoe and seed tube of a planter. Fig. II is a top plan view of the same. Fig. III is a sectional view on the line III—III of Fig. II, the planter parts and disks being omitted.

Referring more in detail to the parts:— 1 designates the "shoe", and 2, the seed tube; of a well known form of corn planter, the seed-tube being integral with the shoe, and having the usual rectangular sectional form.

The frame of the furrow opener comprises a pair of standards or shoe-clamping members 3, a pair of arms, or tube-clamping members 4, and means for holding said members in position. The attachment is completed by a head-block 5 which is held in position as hereinafter described, and is provided with lateral disk-axles 6.

The tube-clamping members 4 are substantially horizontal, and lie at opposite sides of the tube 2, and are clamped upon said tube by two transverse bolts 7 which pass in front and rear of the tube, respectively, the front bolt 7 being preferably in contact with the tube.

The head-block 5 is formed with a plane vertical front face $5^a$, and with inclined lateral faces $5^b$ from which project the disk axles 6. The block has also a plane vertical rear face $5^c$, and is formed with recesses $5^d$ for the reception of the forward ends of the seed tube arms 4, these recesses forming shoulders $5^e$, against which the forward ends of the arms 4 abut.

Cut transversely through the rear part of the block 5 is a vertical slot 8, and in register with said slot the arms 4 are provided with openings for a transverse bolt 9 which passes through said slot and serves to bind the arms 4 upon the block. The slot 8 permits vertical adjustability of the block relatively to said arms 4.

The block 5 is provided with a projecting bolt 10, which extends forwardly and rearwardly, or at right angles to the bolt 9. Bolt 10 may be either a stud-bolt or, as shown, a common bolt having a head 10'. To receive this bolt, the block 5 is cast with a bolt-hole having a squared recess 12 adapted for the reception of the bolt-head 10', and arranged at such a distance in front of the slot 8 that the bolt head 10' cannot interfere with the transverse bolt 9, when the latter is within the upper part of the slot 8.

The standards 3 are substantially vertical, and their lower ends 3' embrace the shoe 1, and are clamped thereto by a transverse bolt 13, which passes through the standards, slightly above the shoe. The standards 3 straddle the bolt 10 and preferably extend thereabove. Bolt 10 is provided with a nut 14 and a washer 15; the latter being held tightly against the front faces of the standards 3, and holding the standards in close contact with the front face of the head-block 5, which latter is partly supported by said standards. After loosening the nuts on the two bolts 9 and 10, the head-block 5 may be either raised or lowered, in order to raise or lower the disks 16. This does not necessitate shifting the arms 4, though the forward bolt 7 may have to be slightly loosened.

In present forms of furrow openers, the bolts or nuts by which the head-block is adjustably secured are difficult of access, unless the disks are first removed. With the construction herein shown, it is evident that the nut 14 is easily reached by a socket wrench, without removing either of the disks, and the rearward bolts 7 are easily reached, because the disks 16 are set at an angle and diverge rearwardly.

Scraper brackets 17 may be mounted on the axles 6, and provided with scrapers 18 for cleaning the disks, the lower ends of these scrapers being preferably projected into grooves 19′ in the disk hubs 19, for the purpose of retaining the disks on the axles.

Having thus described my invention, what I claim as new therein and desire to secure by Letters-Patent is:—

1. In combination, a head-block provided with a longitudinally extending bolt, a pair of standards straddling said bolt, and adapted for attachment to the shoe of a planter, means on said bolt whereby the standards are clamped to said head block, and means for securing the head block to a planter.

2. In combination, a head-block provided with a longitudinally projecting bolt; a nut on said bolt; a pair of vertically disposed bars straddling the projecting part of said bolt and clamped against the head-block by said nut, and means for securing the head block to a planter.

3. In combination, a head-block provided with a longitudinally projecting bolt; a nut on said bolt; a pair of vertically disposed bars straddling the projecting part of said bolt and clamped against the head-block by said nut, said bars being adapted for attachment to a planter shoe, and means for securing the head block to a planter.

4. In combination, a head-block provided with a transverse vertical slot and with lateral recesses forming shoulders; a pair of arms seated in said recesses and abutting against said shoulders; and a bolt passing through said slot and through openings in said arms to secure said arms to said block.

5. In combination, a head-block having a bolt-hole extending therethrough, from front to back and having a bolt-head recess at the rear of said bolt-hole, and a vertical transverse slot intersecting said recess, and disk axles on said block.

6. A head block for furrow opener disks, said block being formed with a transverse vertical slot and with a bolt-hole intersecting said slot horizontally; said openings being adapted to receive bolts for the attachment of supporting members; and disk axles on said block.

7. In combination, a head-block provided with disk axles, a longitudinally extending bolt, a pair of standards straddling said bolt, and adapted for attachment to the shoe of a planter, means on said bolt whereby the standards are clamped to the head-block, and parallel clamping members secured to said block and adapted for engagement with a seed-tube of a planter.

In testimony whereof I affix my signature in presence of two witnesses.

LAURITS T. RASMUSSEN.

Witnesses:
G. F. SPOONER,
W. I. WALKER.

---

Copies of this patent may be obtained for five cents each, by addressing the "Commissioner of Patents, Washington, D. C."